United States Patent
Wang

(10) Patent No.: US 11,211,021 B2
(45) Date of Patent: Dec. 28, 2021

(54) GRAYSCALE ADJUSTMENT METHOD AND GRAYSCALE ADJUSTMENT DEVICE FOR DISPLAY PANEL

(71) Applicants: HKC Corporation Limited, Shenzhen (CN); Chongqing HKC Optoelectronics Technology Co., Ltd., Chongqing (CN)

(72) Inventor: Mingliang Wang, Chongqing (CN)

(73) Assignees: HKC Corporation Limited, Shenzhen (CN); Chongqing HKC Optoelectronics Technology Co., Ltd., Chongqing (CN)

( * ) Notice: Subject to any disclaimer, the term of this patent is extended or adjusted under 35 U.S.C. 154(b) by 119 days.

(21) Appl. No.: 16/620,797

(22) PCT Filed: Jun. 26, 2018

(86) PCT No.: PCT/CN2018/092945
§ 371 (c)(1),
(2) Date: Dec. 9, 2019

(87) PCT Pub. No.: WO2019/001437
PCT Pub. Date: Jan. 3, 2019

(65) Prior Publication Data
US 2020/0126497 A1   Apr. 23, 2020

(30) Foreign Application Priority Data
Jun. 26, 2017 (CN) .......................... 201710497582.2

(51) Int. Cl.
*G09G 5/10* (2006.01)
*G09G 3/36* (2006.01)
(Continued)

(52) U.S. Cl.
CPC .......... *G09G 3/3648* (2013.01); *G09G 3/006* (2013.01); *G09G 3/2803* (2013.01); *G09G 3/36* (2013.01);
(Continued)

(58) Field of Classification Search
CPC ........ G09G 3/3648; G09G 3/006; G09G 5/10; G09G 3/36; G09G 3/3611; G09G 3/2803;
(Continued)

(56) References Cited

U.S. PATENT DOCUMENTS 7,889,235 B2 * 2/2011 Urisu ................... G09G 3/3611
348/191
10,510,289 B2 * 12/2019 Wang ................... G09G 3/3208
(Continued)

*Primary Examiner* — Insa Sadio
(74) *Attorney, Agent, or Firm* — Wang Law Firm, Inc.

(57) ABSTRACT

A grayscale adjustment method of a display panel, a grayscale adjustment device and a display device using the same are provided. The grayscale adjustment method includes steps of capturing an image of the display panel to obtain a current image; identifying a non-uniform block in the current image, and detecting an original output brightness value and an original input grayscale of the non-uniform block; determining a target input grayscale corresponding to a preset target brightness value according to an actual gamma curve value, wherein the actual gamma curve value is obtained by testing the display panel; and setting a difference between the original input grayscale and the target input grayscale as a grayscale compensation value of the non-uniform block.

13 Claims, 8 Drawing Sheets

(51) Int. Cl.
*G09G 3/28* (2013.01)
*H04N 1/407* (2006.01)
*G09G 3/00* (2006.01)
*H04N 9/04* (2006.01)

(52) U.S. Cl.
CPC ......... *G09G 3/3607* (2013.01); *G09G 3/3611* (2013.01); *G09G 5/10* (2013.01); *H04N 1/4078* (2013.01); *H04N 9/04513* (2018.08); G09G 2310/027 (2013.01); G09G 2320/029 (2013.01); G09G 2320/0233 (2013.01); G09G 2320/0626 (2013.01); G09G 2320/0673 (2013.01); G09G 2330/12 (2013.01); G09G 2360/16 (2013.01)

(58) Field of Classification Search
CPC ..... G09G 2310/027; G09G 2320/0233; G09G 2320/0276; G09G 2320/029; G09G 2320/0626; G09G 2320/0673; G09G 2330/12; G09G 2360/145; G09G 2360/16; G09G 3/3607; H04N 9/04513; H04N 1/4015; H04N 1/4078
See application file for complete search history.

(56) References Cited

U.S. PATENT DOCUMENTS

| | | | | |
|---|---|---|---|---|
| 2005/0103976 A1* | 5/2005 | Ioka | | H04N 9/3194 250/208.1 |
| 2005/0237318 A1* | 10/2005 | Inoue | | G09G 5/003 345/207 |
| 2007/0132895 A1* | 6/2007 | Shen | | G09G 3/2007 349/1 |
| 2009/0096740 A1* | 4/2009 | Xia | | G09G 3/3406 345/102 |
| 2012/0206504 A1* | 8/2012 | Ha | | G09G 3/3208 345/690 |
| 2013/0120659 A1* | 5/2013 | Park | | H04N 5/202 348/674 |
| 2013/0135272 A1* | 5/2013 | Park | | G09G 3/3233 345/211 |
| 2013/0314459 A1* | 11/2013 | Nakanishi | | G09G 3/3406 345/694 |
| 2014/0333660 A1* | 11/2014 | Ballestad | | G06K 9/6202 345/593 |
| 2015/0070403 A1* | 3/2015 | Kim | | G09G 3/20 345/690 |
| 2015/0269895 A1* | 9/2015 | Kao | | G09G 3/006 345/690 |
| 2016/0027354 A1* | 1/2016 | Terai | | G09G 3/36 345/87 |
| 2016/0148582 A1* | 5/2016 | Chung | | G09G 3/3611 345/89 |
| 2016/0210901 A1* | 7/2016 | Cha | | G09G 3/03 |
| 2016/0267838 A1* | 9/2016 | Zhang | | G09G 3/2003 |
| 2018/0082627 A1* | 3/2018 | Deng | | G09G 3/3275 |
| 2018/0102091 A1* | 4/2018 | Deng | | G09G 3/3233 |
| 2018/0190214 A1* | 7/2018 | Kim | | G09G 3/2081 |
| 2018/0204529 A1* | 7/2018 | Chen | | G09G 3/006 |
| 2018/0322834 A1* | 11/2018 | Zhang | | G09G 3/2007 |
| 2019/0066574 A1* | 2/2019 | Wang | | G09G 3/3208 |
| 2019/0066627 A1* | 2/2019 | Wang | | G09G 5/10 |
| 2019/0066628 A1* | 2/2019 | Wang | | G09G 5/10 |

* cited by examiner

GRAYSCALE ADJUSTMENT METHOD AND GRAYSCALE ADJUSTMENT DEVICE FOR DISPLAY PANEL

CROSS-REFERENCE TO RELATED APPLICATIONS

This application claims the benefit of Chinese Patent Application No. 201710497582.2, filed on Jun. 26, 2017, to the State Intellectual Property Office of the People's Republic of China, the disclosure of which is incorporated herein in its entirety by reference.

BACKGROUND

1. Field

The present disclosure relates to a liquid crystal panel display field, more particularly to a grayscale adjustment method of a display panel and a grayscale adjustment device.

2. Description of the Related Art

The production process of the liquid crystal panel is very complicated and hard to control and manage, so the Mura effect occurs easily on the LCD panel; furthermore, the brightness difference on some areas or blocks of the LCD panel cause nonuniform display, and it decreases the quality level of the LCD panel. In recent years, with popularization of 2K and 4K television, the Mura effect also occurs on the panel more seriously. In order to reduce the non-uniform area, a Demura technology is developed to use CCD camera to obtain the brightness signal of the panel, thereby detecting the non-uniform area of the image, the central area of panel is set as the reference, the brightness value of other area is compared with the brightness value of the central area to obtain the difference value, and a compensation value is calculated according to the difference value and Gamma 2.2 curve, thereby making the brightness of entire panel uniform.

Above-mentioned Demura technology uses simple structure and is flexible, so it is widely applied; however, the conventional Demura technology can calculate the compensation data only for the panel having the standard Gamma 2.2 curve already, and during the actual production process, it is impossible to accurately control and manage Gamma curve of every panel, and when the calculated grayscale compensation value is not accurate, the effect of Demura process is affected easily.

SUMMARY

An objective of the present disclosure is to provide a grayscale adjustment method of a display panel and a grayscale adjustment device, so as to solve the problem that the Demura performance is not good enough because of inaccurate compensation value, during LCD panel manufacturing process.

According to an embodiment, the present disclosure provides a grayscale adjustment method of a display panel, and the grayscale adjustment method includes steps of: capturing an image of the display panel to obtain a current image; identifying a non-uniform block in the current image, and detecting an original output brightness value and an original input grayscale of the non-uniform block; determining a target input grayscale corresponding to a preset target brightness value according to an actual gamma curve value, wherein the actual gamma curve value is obtained by testing the display panel; setting a difference between the original input grayscale and the target input grayscale as a grayscale compensation value of the non-uniform block.

According to an embodiment, the present disclosure provides a grayscale adjustment device of a display panel, and the grayscale adjustment device includes an image capture module, an identification module, a calculation module and an adjustment module. The image capture module is configured to capture an image of the display panel, to obtain a current image. The identification module is configured to identify a non-uniform block of the current image, and detect an original output brightness value and an original input grayscale of the non-uniform block. The calculation module is configured to determine a target input grayscale corresponding to a preset target brightness value according to an actual gamma curve value, wherein actual gamma curve value is obtained by testing the display panel. The adjustment module is configured to set a difference between the original input grayscale and the target input grayscale as a grayscale compensation value of the non-uniform block.

Preferably, the calculation module further obtains n reference images of the display panel with different input grayscales, and calculates the reference gamma curve value of each of the reference images to set a mean value of the reference gamma curve values as the actual gamma curve value, wherein n is an integer higher than or equal to 2.

According to an embodiment, the present disclosure provides a grayscale adjustment method of a display panel, and the grayscale adjustment method includes steps of: using an image capture module to capture an image of the display panel, to obtain a current image; using an identification module to identify a non-uniform block of the current image, and detecting an original output brightness value and an original input grayscale of the non-uniform block; using a calculation module to obtain n reference images of the display panel with different input grayscales, and calculate a reference gamma curve value of each of the reference images, and set a mean value of the reference gamma curve values as an actual gamma curve value, wherein n is an integer higher than or equal to 5; using the calculation module to determine a target input grayscale corresponding to the preset target brightness value according to the actual gamma curve value; using an adjustment module to set a difference between the original input grayscale and the target input grayscale as a grayscale compensation value of the non-uniform block; transmitting the grayscale compensation value to the display panel, and setting a sum of the grayscale compensation value and the original input grayscale of the non-uniform block as a new input grayscale of the non-uniform block in the display panel, to eliminate the non-uniform block of the current image.

The grayscale adjustment method of the display panel and the grayscale adjustment device of the present disclosure are able to, during the liquid crystal panel manufacturing process, compensate the grayscale of the non-uniform area of the display panel according to actual gamma curve and preset target brightness value.

BRIEF DESCRIPTION OF THE DRAWINGS

The structure, operating principle and effects of the present disclosure will be described in detail by way of various embodiments which are illustrated in the accompanying drawings.

DETAILED DESCRIPTION OF THE PREFERRED EMBODIMENTS

Figure 1:
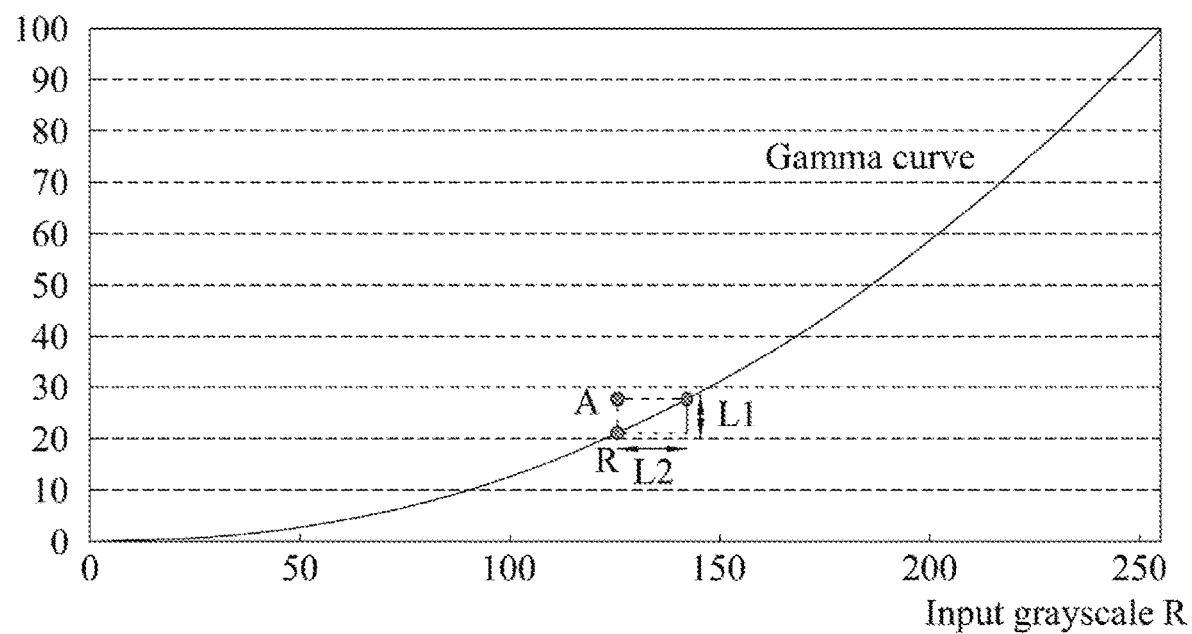
FIG. 1 is a schematic view of operation of obtaining a grayscale compensation value of a display panel of the present disclosure.

The following embodiments of the present disclosure are herein described in detail with reference to the accompanying drawings. These drawings show specific examples of the embodiments of the present disclosure. It is to be understood that these embodiments are exemplary implementations and are not to be construed as limiting the scope of the present disclosure in any way. Further modifications to the disclosed embodiments, as well as other embodiments, are also included within the scope of the appended claims. These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts.

It is to be understood that, although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present disclosure. As used herein, the term "or" includes any and all combinations of one or more of the associated listed items.

The conventional Demura technology uses simple structure and is flexible; so it is widely applied. The conventional Demura technology can calculate the compensation data only for the panel having the standard Gamma 2.2 curve already; however, it is impossible to accurately control and manage the Gamma curve of each panel during the actual manufacturing process, so the final effect of the Demura technology may be affected easily. FIG. 1 shows the principle of calculating the compensation data of the Demura technology. In the Gamma curve shown in FIG. 1, the horizontal axis is input grayscale L which is an objective physical quantity, and the vertical axis is output brightness value T which is subjective brightness feeling of human eye. Suppose that the curve shown in FIG. 1 is Gamma curve 2.2 for easy calculation, and the point T represents a target brightness value, the point R represents an actual brightness value of a non-uniform area. In order to increase the brightness value of the non-uniform area to the target brightness value and obtain a compensation brightness value L1, the compensation grayscale L2 of the Gamma 2.2 curve with respect to the horizontal axis must be obtained first. However, if the actual Gamma curve of the panel is not Gamma 2.2 curve, the compensation effect may be affected to fail in reducing the non-uniform area of the panel.

Figure 2:
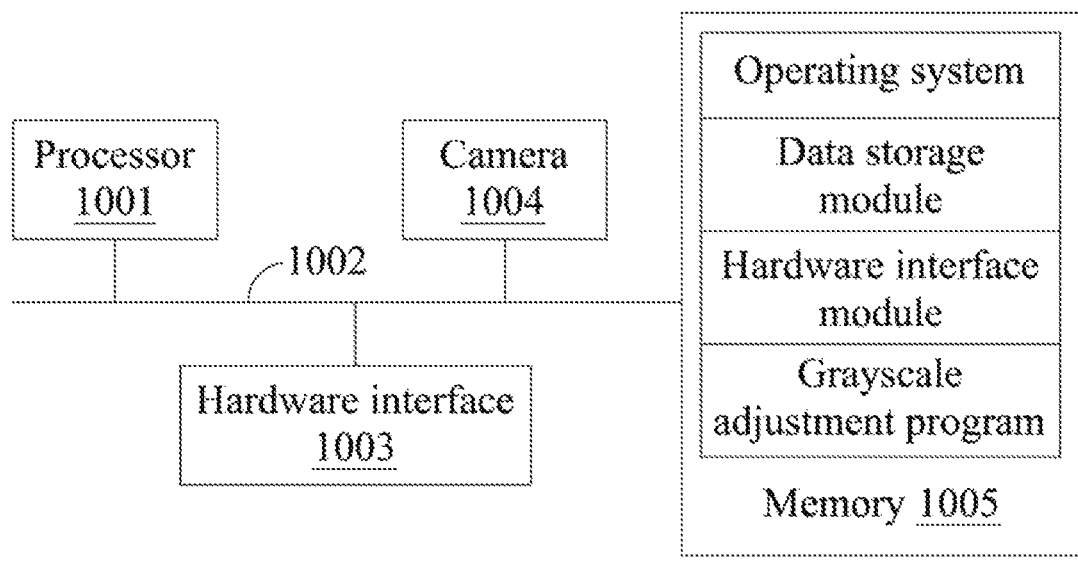
FIG. 2 is a schematic structural view of a grayscale adjustment device of a display panel of the hardware solution of an embodiment of the present disclosure.

Please refer to FIG. 2. FIG. 2 is a schematic structural view of the grayscale adjustment device of the display panel, according to hardware solution of an embodiment of the present disclosure.

As shown in FIG. 2, the grayscale adjustment device can include a processor 1001 (such as CPU), a communication bus 1002, a hardware interface 1003, a camera 1004, and a memory 1005. The communication bus 1002 is configured to electrically connect and communicate between these devices. The hardware interface 1003 comprises a liquid crystal display panel. Preferably, the camera 1004 can be an optical CCD camera having high precision and high resolution. The resolution of the CCD can be equal to that of human eye. The memory 1005 can be a high-speed RAM memory or non-volatile memory, and also include EEPROM.

One of ordinary skill in the art can construe that the present disclosure is not limited to the devices and structure shown in FIG. 2. The embodiment of grayscale adjustment device can be implemented by fewer components, more components, a combination of some components, or other components.

As shown in FIG. 2, the memory 1005, which is served as computer storage medium, can include an operating system, a data storage module, a hardware interface module and a grayscale adjustment program of the display panel.

In FIG. 2, the camera 1004 is used to capture the image of the display panel, and the hardware interface 1003 is used to exchange data with the display panel. The processor 1001 and the memory 1005 can be disposed in the grayscale adjustment device of the present disclosure, and the processor 1001 executes the grayscale adjustment program stored in the memory 1005 for operations of: capturing an image of the display panel to obtain a current image; identifying a non-uniform block in the current image; detecting an original output brightness value and an original input grayscale of the non-uniform block; determining a target input grayscale corresponding to a preset target brightness value according to the actual gamma curve value, wherein the actual gamma curve value is obtained by testing the display panel; setting a difference between the original input grayscale and the target input grayscale as the grayscale compensation value of the non-uniform block.

Optionally, processor 1001 can access the grayscale adjustment program stored in the memory 1005, to execute the operations of obtaining n reference images of the display panel with different input grayscales; calculating a reference gamma curve value of each reference image; and setting a mean value of the reference gamma curve values as the actual gamma curve value, wherein n is an integer higher than or equal to 2.

Optionally, the processor 1001 can access the grayscale adjustment program stored in the memory 1005, to execute the operations of: detecting a reference input grayscale and a reference output brightness value of each reference image;

and calculating the reference gamma curve value of each reference image according to the reference input grayscale, a reference output brightness value and a gamma mathematic model. The gamma mathematic model expresses the corresponding relationship between the reference input grayscale and the reference output brightness value.

Optionally, the processor 1001 can access the grayscale adjustment program stored in the memory 1005, to execute the operations of: obtaining an output brightness value of a central point of the current image of the display panel, and setting the output brightness value of the central point as the preset target brightness value.

Optionally, the processor 1001 can access the grayscale adjustment program stored in the memory 1005, to execute the operations of: obtaining an output brightness value of each pixel of remaining blocks of the current image other than the non-uniform block; and setting a mean value of the obtained output brightness values as the preset target brightness value.

Optionally, the processor 1001 can access the grayscale adjustment program stored in the memory 1005, to execute the operations of: transmitting the grayscale compensation value to the display panel, and setting the sum of the grayscale compensation value and the original input grayscale of the non-uniform block as the new input grayscale of the non-uniform block, to eliminate the non-uniform block of the current image.

In the embodiment of the present disclosure, the grayscale adjustment device can capture the image of the display panel to obtain the current image, identify the non-uniform block in the current image, and detect the original output brightness value and the original input grayscale of the non-uniform block, and determine the target input grayscale corresponding to the preset target brightness value according to the actual gamma curve value which is obtained by testing the display panel, and set the difference between the original input grayscale and the target input grayscale as the grayscale compensation value of the non-uniform block. As a result, the technical solution of the present disclosure is able to solve the problem that the Demura performance is not good enough because of inaccurate compensation value, during the LCD panel manufacturing process.

The present disclosure further provides a grayscale adjustment method of a display panel.

Figure 3:
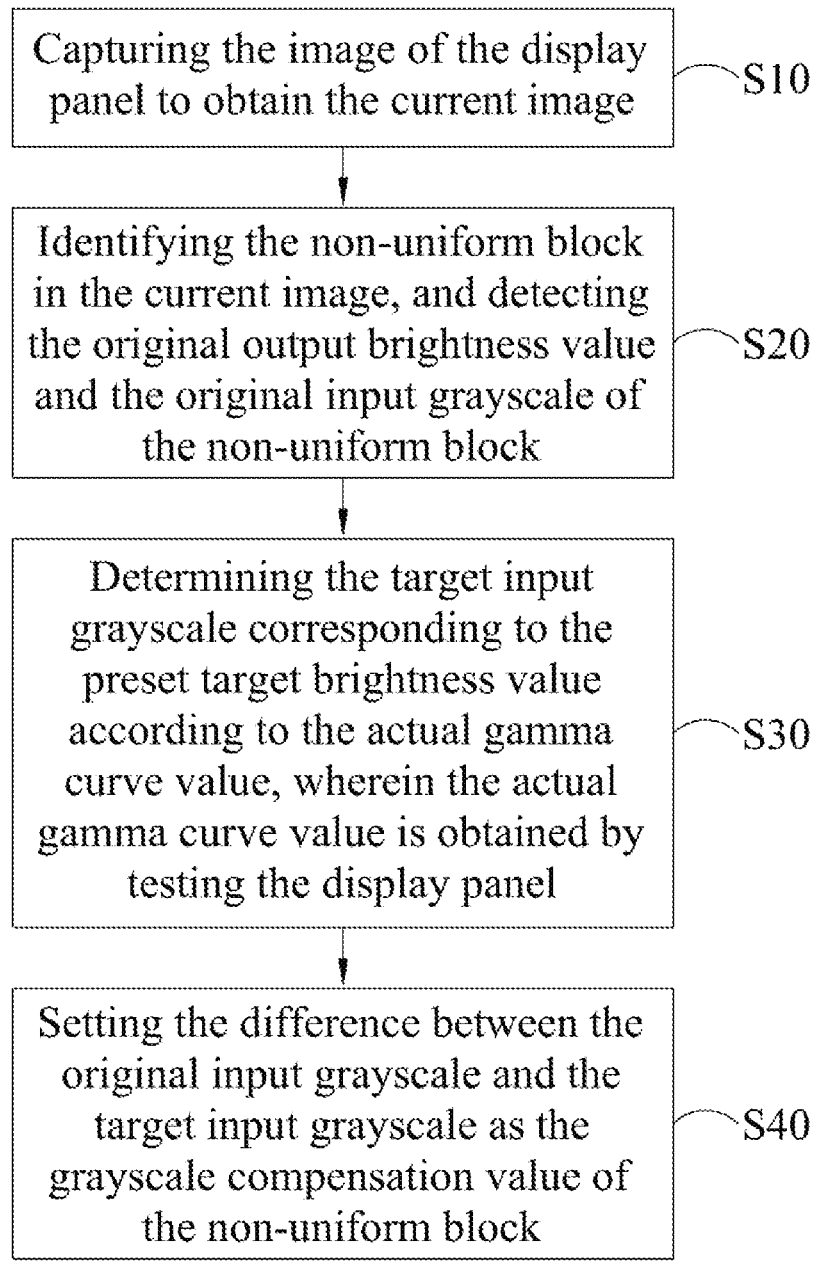
FIG. 3 is a flow chart of a grayscale adjustment method of a display panel, according to a first embodiment of the present disclosure.

Please refer to FIG. 3. FIG. 3 is a flow chart of a grayscale adjustment method of a display panel, according to a first embodiment of the present disclosure.

In this embodiment, the method includes following steps S10 through S40.

The step S10 is a step of capturing the image of the display panel to obtain the current image.

In an embodiment, the current image is an image displayed on the display panel at the present.

In particular implementation, after the display panel is turned on, the CCD camera can be used to capture the image displayed on the panel, and the capture image is the current image.

It is to be noted that, the display panel of this embodiment can be a LCD panel, and the LCD panel can be applied to computer display, television, or tablet computer.

The step S20 is a step of identifying the non-uniform block in the current image, and detecting the original output brightness value and the original input grayscale of the non-uniform block.

In particular implementation, during the display panel manufacturing process, the current image of the display panel may have non-uniform area, and the operation of capturing the image of the display panel is to extract the brightness signal of the non-uniform block of the current image.

It is to be noted that, the brightness signal includes an input grayscale and an output brightness value, and the input grayscale is a grayscale which the display device is able to identify, and the grayscale expresses an actual objective brightness value which is objective nature physical quantity. The display panel continuously receives different input voltages which are also called gamma voltages, and the grayscales corresponding to the different input voltages are different. The output brightness value is the subjective brightness felt by human eye. The human's perception for the stimulation in nature is nonlinear, when the outside stimulation is increased by a certain ratio, the human feels the stimulation increasing linearly; similarly, the human eye's perception for the brightness in nature is also nonlinear. For this reason, the subjective brightness felt by the human eye and the actual objective brightness is not exactly the same, and the gamma curve is used to coordinate the mapping relationship between the subjective brightness felt by human eye and the actual objective brightness, to coordinate the mapping relationship between the output brightness value and the input grayscale, formula: output value=input value$^{Gamma}$ expresses the relationship between these two values.

The output brightness value of the initial displayed image is known, and this output brightness value is also the subjective brightness felt by the human eye. The grayscale value of the initial display screen is also known, and the grayscale value is the input grayscale, but the panel may have non-uniform areas according to the grayscale. Some non-uniform areas are very significant and can be found by the human eye, but some slightly non-uniform areas are hard to be found by human eye. The professional apparatus can be used to detect and identify the non-uniform block (area) of the current image, analyze the pixel distribution characteristic according to the captured current image, and identify the non-uniform according to algorithm. There are many algorithms for detecting the non-uniform area, but the present disclosure is not limited to particular algorithm.

The step S30 is a step of determining the target input grayscale corresponding to the preset target brightness value according to the actual gamma curve value. The actual gamma curve value is obtained by testing the display panel.

It is to be noted that, in this embodiment, the current image have an area with uniform brightness, which is an output brightness value of the display area, and the output brightness value is set as the preset target brightness value.

In particular implementation, the grayscale adjustment method is to obtain the output brightness value of the central point of the current image, set the output brightness value of the central point as the preset target brightness value. That is, the output brightness value of the central area of the current image is obtained, and the central area of panel is set as the reference, and the brightness of other area and the brightness of the central area are compared to obtain the difference. During the display panel manufacturing process, the central point of the display panel usually has the best optical quality, so the panel is debugged based on the central point of the panel.

Optionally, the grayscale adjustment method is to obtain the output brightness value of each of pixels of remaining blocks (areas) other than the non-uniform block (area) of the current image, to calculate the mean value of the output brightness value of the pixels, and set the mean value of the output brightness value as the preset target brightness value.

The step S40 is a step of setting the difference between the original input grayscale and the target input grayscale as the grayscale compensation value of the non-uniform block.

Figure 4:
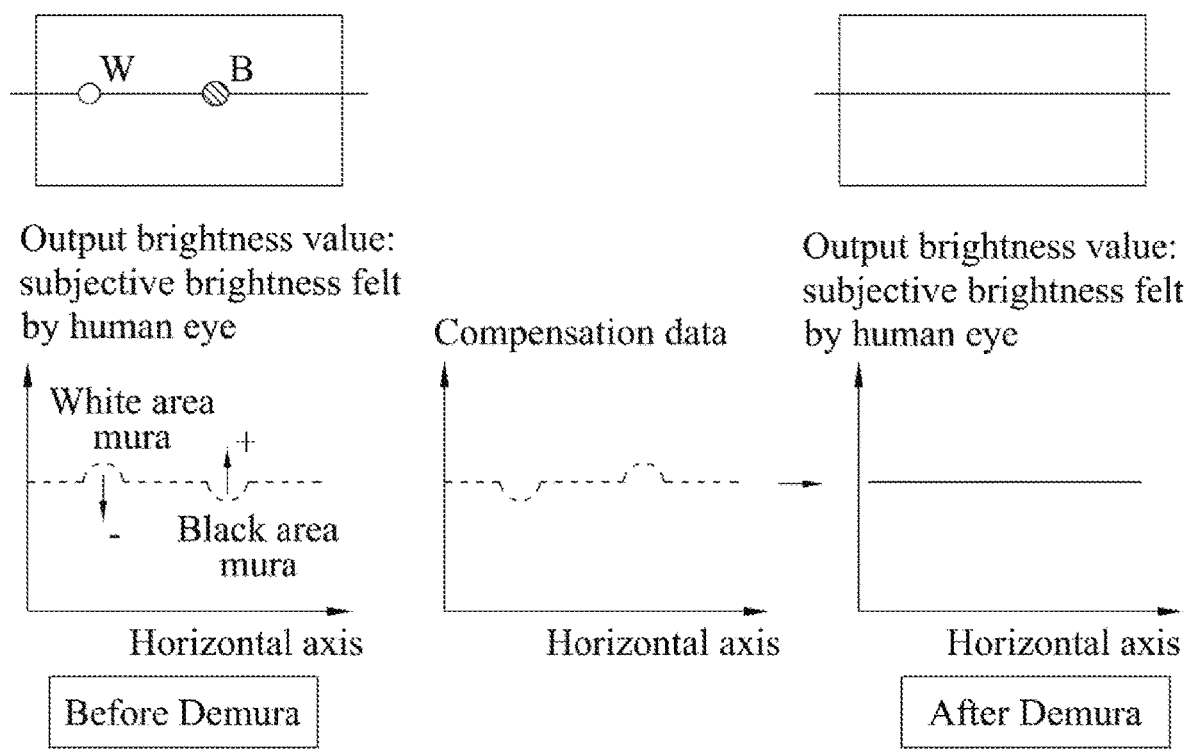
FIG. 4 is a schematic view of operation of reducing the non-uniform area of the display panel, according to an embodiment of the present disclosure.

Please refer to FIG. 4. Suppose that there are a non-uniform white block W and a non-uniform black block B at the left side of the image in horizontal direction, through the step S40, the difference between the original grayscale value (that is, the input grayscale value) and the target grayscale value is set as the compensation data (that is, the grayscale compensation value) of the non-uniform block, to compensate the two areas. The display data of the area is formed by adding the original display data and the compensation data, and the compensation data of the white non-uniform block is minus, so that the display data is decreased; and, the display data of the black non-uniform block is increased, so as to obtain the uniform brightness, to reduce the non-uniform area.

Figure 5:
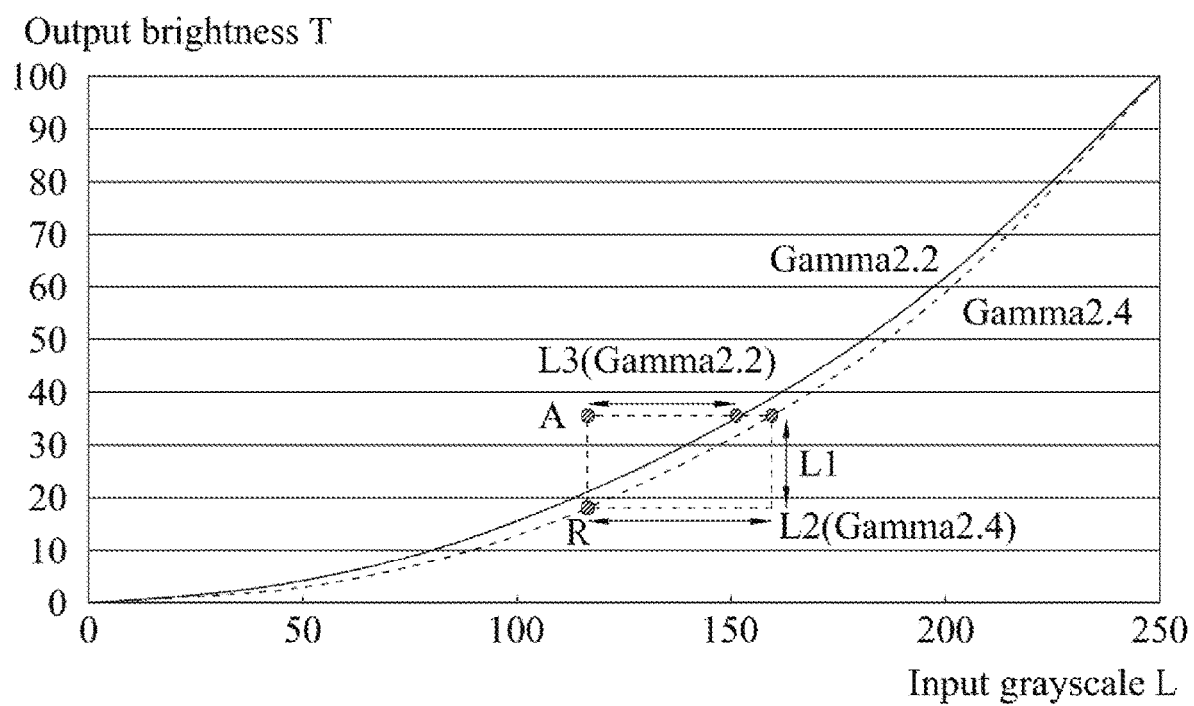
FIG. 5 is a schematic view of operation of compensating the non-uniform area of the display panel, according to an embodiment display panel the present disclosure.

Please refer to FIG. 5. Suppose that the detected Gamma curve value of the panel is 2.4 (that is, the Gamma 2.4 curve), the dashed line is the Gamma curve with a value of 2.4, the solid line is a Gamma curve with a value of 2.2 (that is, the Gamma 2.2 curve). For the same compensation brightness difference L1, the grayscale compensation value L3 obtained according to the Gamma 2.2 curve is different from the grayscale compensation value L2 obtained according to the Gamma 2.4 curve. The grayscale compensation values obtained according to different Gamma curves are different, the grayscale compensation value L3 is smaller than the grayscale compensation value L2; for this reason, it is optimal to use the compensation compliant with the property of the panel.

After the step S40, the obtained grayscale compensation value can be programmed to the ROM memory EEPROM, to implementation the compensation effect for the current image, transmit the grayscale compensation value to the display panel, and set the sum of the grayscale compensation value and the original input grayscale of the non-uniform block as the new input grayscale of the non-uniform block, so as to reduce the non-uniform block of the current image.

During the process of manufacturing every liquid crystal panel, the grayscale compensation is performed on the non-uniform block (area) of the display panel according to the actual gamma curve and the preset target brightness value, so as to provide most accurate compensation, to accurately effectively reduce the non-uniform (Mura) area of the display panel.

Figure 6:
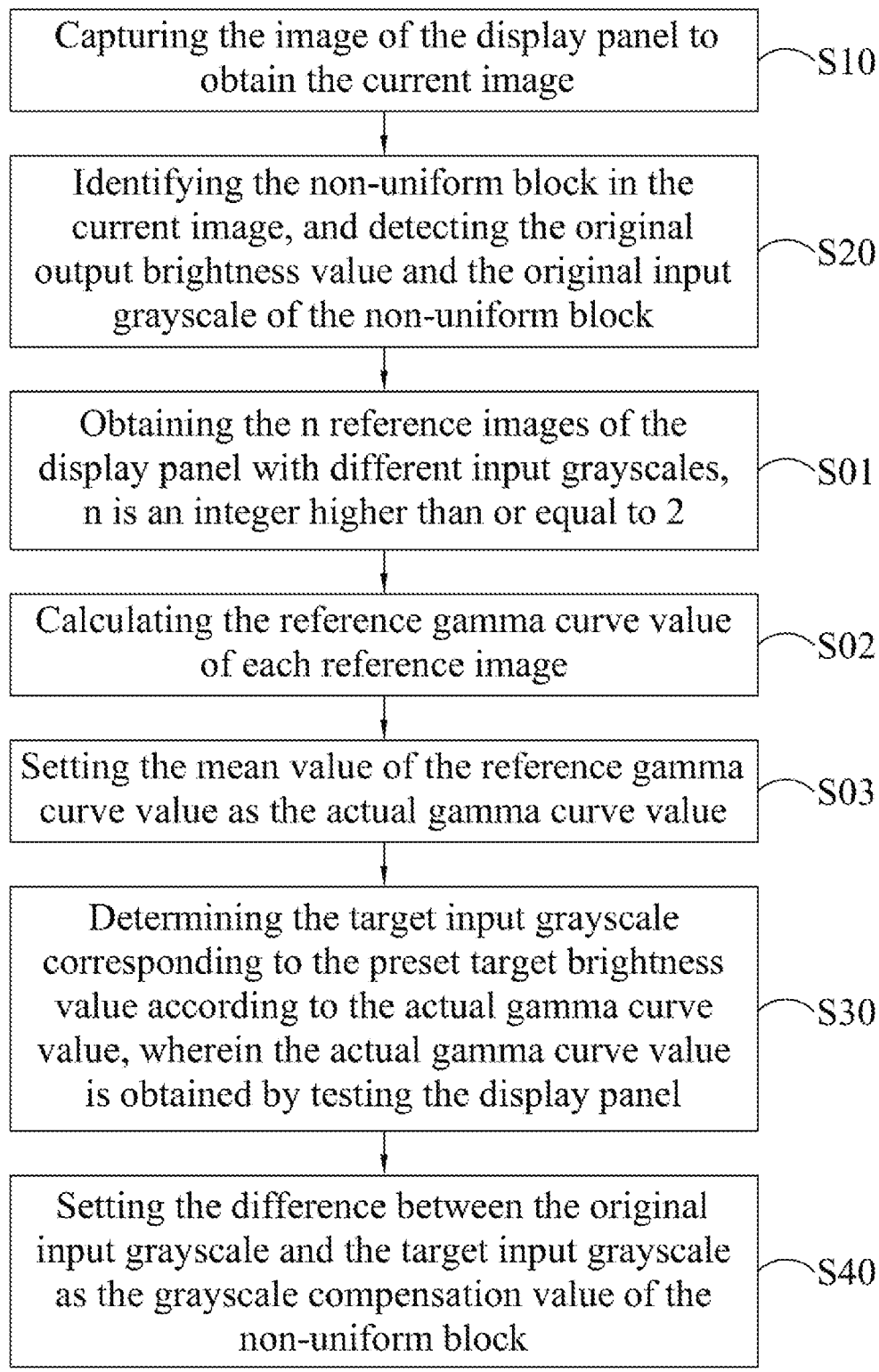
FIG. 6 is a flow chart of a grayscale adjustment method of a display panel according to a second embodiment of the present disclosure.

Please refer to FIG. 6. FIG. 6 shows a grayscale adjustment method of a display panel of a second embodiment of the present disclosure. FIG. 6 is illustrated based on the embodiment shown in FIG. 3.

In this embodiment, before the step S30 of determining the target input grayscale corresponding to the preset target brightness value according to the actual gamma curve value, the method includes following steps S01 through S04.

The step S01 is a step of obtaining the n reference images of the display panel with different input grayscales, n is an integer higher than or equal to 2.

In particular implementation, after the driver circuit lights up the display panel, the CCD camera with high precision and high resolution photographs the initial display condition of the display panel, that is, the CCD camera captures the current image of the display panel, and the CCD camera also photographs the current display condition of image with different grayscale values shown on the display panel. The image with different grayscale values are served as the reference images. The non-uniform blocks (areas) of the reference images are exactly the same as the non-uniform blocks (areas) of the current image.

The CCD camera can capture more than 5 reference images upon actual demand. The 5 reference images are taken as example, the screen images of the display panel with 5 grayscale values are captured respectively to generate the 5 reference images, for example, the first reference image corresponds to the grayscale with value of 0, the fifth reference image corresponds to the grayscale with value of 255, and the other three reference images correspond to the grayscale with three different values. Furthermore, the operation of capturing more reference images does not add workload and difficulty.

The step S02 is a step of calculating the reference gamma curve value of each reference image.

In this embodiment, the three reference images corresponding to grayscales of three middle values are detected to extract the reference input grayscale values and the reference output brightness value corresponding thereto. Next, the reference gamma curve value of each reference image is calculated according to the reference input grayscale value, the reference output brightness value and the gamma mathematic model. The gamma mathematic model expresses the corresponding relationship between the reference input grayscale value and the reference output brightness value.

There is a nonlinear mapping relationship between the input grayscale and the output brightness value of each reference image. The input grayscale value represents the gamma voltage which is an objective physical quantity of the computer identification, and the output brightness value represents the subjective brightness felt by human eye. The gamma curve can respond the mapping relationship, which is also called as the gamma mathematic model. The nonlinear mapping relationship is usually expressed by output brightness value=input grayscale$^{Gamma}$. The input grayscale of each reference image is known, and the reference image is captured by the CCD camera, so that the output brightness value of each reference image can be measured, and the output brightness value is also known. The Gamma value of each reference image can be calculated based on the formula: output brightness value=input grayscale$^{Gamma}$. The Gamma values of reference images are not the same, and there are certain differences between these Gamma values.

In particular implementation, the gamma mathematic model is:

$$\frac{Tx - To}{T255 - To} = \left(\frac{Lx}{255}\right)^{Gamma}$$

wherein Tx is the reference output brightness value, T255 is the output brightness value corresponding to the input grayscale with a value of 255, T0 is the output brightness value corresponding to the input grayscale with a value of 0, Lx is the reference input grayscale, and Gamma is the actual gamma curve value.

In this embodiment, the gamma mathematic model is used to calculate the gamma curve value of each reference image, so as to make the gamma curve value of each reference image closer to the actual gamma curve value of the display panel. By using aforementioned formula to calculate the gamma curve value of each reference image, the difference between the calculated result and the actual gamma curve value of the display panel can be reduced.

The step S03 is a step of setting the mean value of the reference gamma curve value as the actual gamma curve value.

There are differences between the calculated gamma curve values of the reference images, so the mean value of these gamma curve values can be used to represent the gamma curve closest to the actual condition of the panel. The gamma curve with the mean value is set as the actual gamma curve, and the actual gamma curve is served as the reference to calculate the actual compensation values of the non-uniform blocks (areas) of the current image of the display panel, thereby achieving most accurate compensation.

In this embodiment, the images of the display panel with different grayscales are captured to measure the actual gamma curve of the display panel, and the captured images are in cooperation with the gamma mathematic model to detect the reference gamma curve values of the display panel with different grayscales, and the mean value of the reference gamma curve values are served as the actual gamma curve value closest to the actual condition of the display panel, so as to effectively obtain the actual gamma curve of the display panel during display panel manufacturing process, and more accurately obtain the grayscale compensation values of the non-uniform areas.

Figure 7:
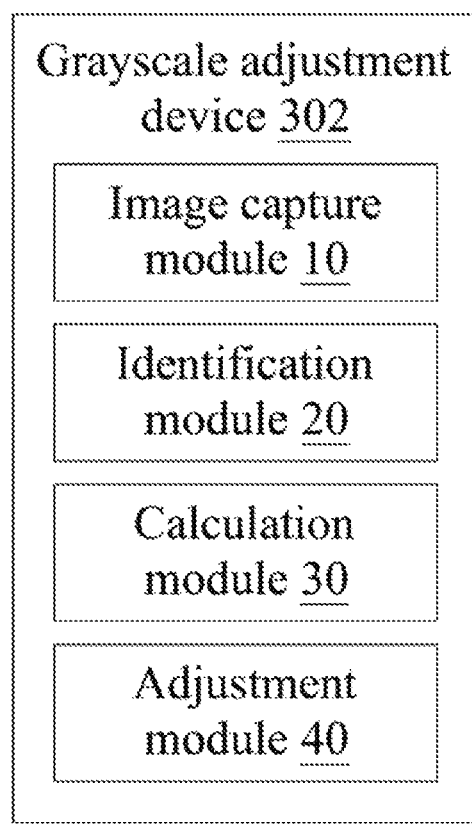
FIG. 7 a block diagram of the grayscale adjustment device of a display panel according to an embodiment of the present disclosure.

Please refer to FIG. 7. FIG. 7 is a block diagram of a grayscale adjustment device of a display panel according to an embodiment of the present disclosure. The grayscale adjustment device 302 of the display panel includes following modules.

An image capture module 10 is configured to capture the image of the display panel, obtain the current image. Preferably, the current image is an image displayed on the display panel at the present.

In particular implementation, after the display panel is turned on, the CCD camera can be used to capture the image (that is, the current image) displayed on the panel.

It is to be noted that, in this embodiment, the display panel can be a LCD panel, and the LCD panel can be applied to computer display, television, and tablet computer.

An identification module 20 is configured to identify the non-uniform block (or area) of the current image, and detect the original output brightness value and the original input grayscale of the non-uniform block.

During the display panel manufacturing process, the current image of the display panel may have non-uniform area, so that the operation of capturing the image of the display panel and the operation of extracting the brightness signal of the non-uniform block of the current image can be performed at the same time.

It is to be noted that the brightness signal includes an input grayscale and an output brightness value. The input grayscale is a grayscale which the display panel (or device) is able to identify the grayscale expresses an actual objective brightness, which is an objective nature physical quantity. The display continuously receives different input voltages which are also called gamma voltages, and the grayscales corresponding to the different input voltages are different. The output brightness value is the subjective brightness felt by human eye. The human's perception for the stimulation in nature is nonlinear, when the outside stimulation is increased by a certain ratio, the human feels the stimulation increasing linearly; similarly, the human eye's perception for the brightness in nature is also nonlinear. For this reason, the subjective brightness felt by the human eye and the actual objective brightness is not exactly the same, so that the gamma curve can be used to coordinate the mapping relationship between the subjective brightness felt by human eye and the actual objective brightness, to coordinate the mapping relationship between the output brightness value and the input grayscale. The formula: output value=input value$^{Gamma}$ expresses the relationship between these two values.

The output brightness value of the initial displayed image is known, and this output brightness value is also the subjective brightness felt by the human eye. The grayscale value of the initial display screen is also known, and the grayscale value is the input grayscale, but the panel may have nonuniform area according to the grayscale. Some non-uniform areas are very significant and can be found by the human eye, but some slightly non-uniform areas are hard to be found by human eye. The professional apparatus can be used to detect and identify the non-uniform block (area) of the current image, analyze the pixel distribution characteristic according to the captured the current image, and identify the non-uniform according to some algorithms. There are many algorithms for detecting the non-uniform area, and the present disclosure is not limited to particular algorithm.

A calculation module 30 is configured to determine the target input grayscale corresponding to the preset target brightness value according to the actual gamma curve value. The actual gamma curve value is obtained by testing the display panel.

In this embodiment, it is to be noted that the current image have an area with uniform brightness, which can be the output brightness value of the display area, and the output brightness value can be set as the preset target brightness value.

In particular implementation, the grayscale adjustment device can obtain the output brightness value of the central point of the current image, and set the output brightness value of the central point as the preset target brightness value, and obtain the output brightness value of the central area of the current image, to set the central area of panel as the reference and then compare the brightness of other area and the brightness of the central area to obtain the difference. During the display panel manufacturing process, the central point of the display panel usually have the best optical quality, so that the display panel is usually debugged based on the central point of the panel.

Optionally, the grayscale adjustment device can obtain the output brightness value of each of pixels of remaining block (area) other than the non-uniform block (area) of the current image, to calculate the mean value of the output brightness value of the pixels, and set the mean value of the output brightness value as the preset target brightness value.

An adjustment module 40 is configured to set the difference between the original input grayscale and the target input grayscale as the grayscale compensation value of the non-uniform block.

Please refer to FIG. 4. Suppose that there are non-uniform white block W and a non-uniform black block B at the left side of the image in horizontal direction, and the adjustment module 40 can use the difference between the original (input) grayscale value and the target grayscale value as the compensation data (that is, the grayscale compensation value) of the non-uniform block, to compensate the two areas. The display data of the area is formed by adding the original display data and the compensation data. For example, the compensation data of the white non-uniform block is minus, so the display data is decreased; the display data of the black non-uniform block is increased, so as to obtain the uniform brightness, and reduce or eliminate the non-uniform area.

Please refer to FIG. 5. In particular implementation, suppose that the detected Gamma curve value of the panel is 2.4, the dashed line of FIG. 5 is the Gamma curve with a value of 2.4, the solid line of FIG. 5 is a Gamma curve with a value of 2.2. For the same compensation the brightness difference L1, the grayscale compensation value L3 obtained according to the Gamma curve with a value of 2.2 is different from the grayscale compensation value L2 obtained according to the Gamma curve with a value of 2.4, and the grayscale compensation value obtained according to different Gamma curves are different. The grayscale compensation value L3 is smaller than the grayscale compensation value L2. For this reason, it is optimal to use the compensation compliant with the property of the panel. The grayscale compensation values can be programmed into the EEPROM, to implementation the compensation effect for the current image. For example, the grayscale adjustment device can transmit the grayscale compensation value to the display panel, and set the sum of the grayscale compensation value and the original input grayscale of the non-uniform block as the new input grayscale of the non-uniform block, so as to reduce or eliminate the non-uniform block of the current image.

The grayscale adjustment device of the display panel can be implemented by following method. The method includes the steps of using the image capture module to capture the image of the display panel to obtain the current image; using the identification module to identify the non-uniform block of the current image; detecting the original output brightness value and the original input grayscale of the non-uniform block; using the calculation module to obtain the n reference images of the display panel with different input grayscales, and calculating the reference gamma curve value of each reference image, wherein n is an integer higher than or equal to 5; setting the mean value of the reference gamma curve value as the actual gamma curve value; using the calculation module to determine the target input grayscale corresponding to the preset target brightness value according to the actual gamma curve value; using the adjustment module to set the difference between the original input grayscale and the target input grayscale as the grayscale compensation value of the non-uniform block; transmitting the grayscale compensation value to the display panel, and setting the sum of the grayscale compensation value and the original input grayscale of the non-uniform block as the new input grayscale of the non-uniform block, so as to reduce or eliminate the non-uniform block of the current image.

Figure 8:
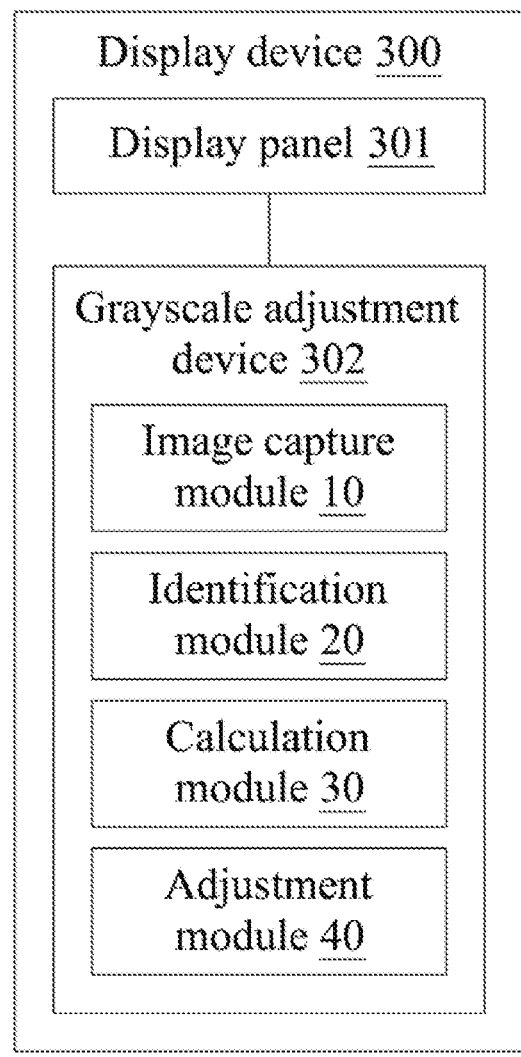
FIG. 8 is a block diagram of a display device of an embodiment of the present disclosure.

Please refer to FIG. 8. FIG. 8 is a block diagram of a display device according to an embodiment of the present disclosure, the display device 300 comprises the display panel 301 and the grayscale adjustment device 302. The grayscale adjustment device 302 includes an image capture module 10, an identification module 20, a calculation module 30 and an adjustment module 40.

The image capture module 10 is configured to capture the image of the display panel, obtain the current image.

The identification module 20 is configured to identify the non-uniform block of the current image, and detect the original output brightness value and the original input grayscale of the non-uniform block.

The calculation module 30 is configured to determine the target input grayscale corresponding to the preset target brightness value according to the actual gamma curve value. The actual gamma curve value is obtained by testing the display panel.

The adjustment module 40 is configured to set the difference between the original input grayscale and the target input grayscale as the grayscale compensation value of the non-uniform block.

It is to be noted that the display panel of this embodiment can be a LCD panel, and the LCD panel can be applied to computer display, television, or tablet computer.

During the process of manufacturing every liquid crystal panel, the grayscale of the non-uniform area of the display panel can be compensated according to actual gamma curve and the preset target brightness value, so as to provide most accurate compensation, and accurately effectively reduce the non-uniform (Mura) area of the display panel.

Furthermore, an embodiment of the present disclosure further provides a computer readable storage medium which is used to store the grayscale adjustment program for the display panel. The processor can execute the grayscale adjustment program to perform following operations.

The image of the display panel is captured to obtain the current image.

The non-uniform block in the current image is identified, and the original output brightness value and the original input grayscale of the non-uniform block are detected.

The target input grayscale corresponding to the preset target brightness value is determined according to the actual gamma curve value, and the actual gamma curve value is obtained by testing the display panel.

The difference between the original input grayscale and the target input grayscale is set as the grayscale compensation value of the non-uniform block.

Optionally, the processor can execute the grayscale adjustment program to further implement following operations.

The n reference images of the display panel with different input grayscales are obtained, and n is an integer higher than or equal to 2.

The reference gamma curve value of each reference image is calculated.

The mean value of the reference gamma curve value is set as the actual gamma curve value.

Optionally, the processor can execute the grayscale adjustment program to further implement following operations.

The reference input grayscale and the reference output brightness value of each reference image is detected.

The reference gamma curve value of each reference image is calculated according to the reference input grayscale, the reference output brightness value and the gamma mathematic model. The gamma mathematic model expresses the corresponding relationship between the reference input grayscale and the reference output brightness value.

Optionally, the processor can execute the grayscale adjustment program to further implement following operations.

The output brightness value of the central point of the current image of the panel is obtained, and the output brightness value of the central point is set as the preset target brightness value.

Optionally, the processor can execute the grayscale adjustment program to further implement following operations.

The output brightness value of each pixel of remaining area of the current image other than the non-uniform area is obtained.

The mean value of the output brightness value of the pixels is calculated, and the mean value of the output brightness value is set as the preset target brightness value.

Optionally, the processor can execute the grayscale adjustment program to further implement following operations.

The grayscale compensation value is transmitted to the display panel, and the sum of the grayscale compensation value and the original input grayscale of the non-uniform block is set as the new input grayscale of the non-uniform block, so as to reduce or eliminate the non-uniform block of the current image.

According to aforementioned technical solution of the present disclosure, by capturing the images of the display panel with different grayscales and using the gamma mathematic model to detect the gamma curve value of the display panel with different grayscales, the mean value of the gamma curve value can be served as the actual gamma curve value closest to the actual condition of the display panel, so as to effectively obtain the actual gamma curve of the display panel during the display panel manufacturing process, and more accurately obtain the grayscale compensation value of the non-uniform area, thereby solving the problem that the Demura performance is not good enough because of inaccurate compensation value during the LCD panel manufacturing process.

The present disclosure disclosed herein has been described by means of specific embodiments. However, numerous modifications, variations and enhancements can be made thereto by those skilled in the art without departing from the spirit and scope of the disclosure set forth in the claims.

What is claimed is:

1. A grayscale adjustment method of a display panel, comprising:
    capturing an image of the display panel to obtain a current image;
    identifying a non-uniform block in the current image, and detecting an original output brightness value and an original input grayscale of the non-uniform block;
    obtaining n reference images of the display panel with different input grayscales, wherein n is an integer higher than or equal to 2;
    detecting a reference input grayscale and a reference output brightness value of each of the reference images;
    calculating the reference gamma curve value of each of the reference images according to the reference input grayscale, the reference output brightness value and a gamma mathematic model, wherein the gamma mathematic model is $$\frac{Tx - To}{T255 - To} = \left(\frac{Lx}{255}\right)^{Gamma}$$

wherein Tx is the reference output brightness value, T255 is the output brightness value corresponding to the input grayscale with a value of 255, T0 is the output brightness value corresponding to the input grayscale with a value of 0, Lx is the reference input grayscale, and Gamma is the actual gamma curve value;
    setting a mean value of the reference gamma curve values as the actual gamma curve value;
    determining a target input grayscale corresponding to a preset target brightness value according to an actual gamma curve value, wherein the actual gamma curve value is obtained by testing the display panel; and
    setting a difference between the original input grayscale and the target input grayscale as a grayscale compensation value of the non-uniform block.

2. The grayscale adjustment method according to claim 1, wherein n is an integer higher than or equal to 5.

3. The grayscale adjustment method according to claim 1, before the step of determining the target input grayscale corresponding to the preset target brightness value according to the actual gamma curve value, the grayscale adjustment method further comprising:
    obtaining an output brightness value of a central point of the current image, to set the output brightness value of the central point of the current image as the preset target brightness value.

4. The grayscale adjustment method according to claim 1, before the step of determining the target input grayscale corresponding to the preset target brightness value according to the actual gamma curve value, the grayscale adjustment method further comprising:
    obtaining an output brightness value of each of pixels of remaining blocks of the current image other than the non-uniform block; and
    setting a mean value of the obtained output brightness values as the preset target brightness value.

5. The grayscale adjustment method according to claim 1, after the step of setting the difference between the original input grayscale and the target input grayscale as the grayscale compensation value of the non-uniform block, the grayscale adjustment method further comprising:
    transmitting the grayscale compensation value to the display panel, and setting a sum of the grayscale compensation value and the original input grayscale of the non-uniform block as a new input grayscale of the non-uniform block in the display panel, to eliminate the non-uniform block of the current image.

6. A grayscale adjustment device of a display panel, comprising:
    an image capture module configured to capture an image of the display panel, to obtain a current image;
    an identification module configured to identify a non-uniform block of the current image, and detect an original output brightness value and an original input grayscale of the non-uniform block;
    a calculation module configured to determine a target input grayscale corresponding to a preset target brightness value according to an actual gamma curve value, wherein the actual gamma curve value is obtained by testing the display panel, wherein the calculation module further obtains n reference images of the display panel with different input grayscales, and calculates the reference gamma curve value of each of the reference images to set a mean value of the reference gamma curve values as the actual gamma curve value, wherein n is an integer higher than or equal to 2, and the calculation module detects a reference input grayscale and a reference output brightness value of each of the reference images, and calculates the reference gamma curve value of each of the reference images according to the reference input grayscale, the reference output brightness value and a gamma mathematic model, wherein the gamma mathematic model is:

$$\frac{Tx - To}{T255 - To} = \left(\frac{Lx}{255}\right)^{Gamma}$$

wherein Tx is the reference output brightness value, T255 is the output brightness value corresponding to the input grayscale with a value of 255, T0 is the output brightness value corresponding to the input grayscale with a value of 0, Lx is the reference input grayscale, and Gamma is the actual gamma curve value;

an adjustment module configured to set a difference between the original input grayscale and the target input grayscale as a grayscale compensation value of the non-uniform block.

7. The grayscale adjustment device according to claim 6, wherein n is an integer higher than or equal to 5.

8. The grayscale adjustment device according to claim 6, wherein the calculation module obtains an output brightness value of a central point of the current image, and sets the output brightness value of the central point of the current image as the preset target brightness value.

9. The grayscale adjustment device according to claim 6, wherein the calculation module obtains an output brightness value of each of pixels of remaining blocks of the current image other than the non-uniform block, and sets a mean value of the obtained output brightness value as the preset target brightness value.

10. The grayscale adjustment device according to claim 6, wherein the adjustment module transmits the grayscale compensation value to the display panel, and sets a sum of the grayscale compensation value and the original input grayscale of the non-uniform block as a new input grayscale of the non-uniform block in the display panel, to eliminate the non-uniform block of the current image.

11. A grayscale adjustment method of a display panel, comprising:

using an image capture module to capture an image of the display panel, to obtain a current image;

using an identification module to identify a non-uniform block of the current image, and detecting an original output brightness value and an original input grayscale of the non-uniform block;

using a calculation module to obtain n reference images of the display panel with different input grayscales, and calculate a reference gamma curve value of each of the reference images, and set a mean value of the reference gamma curve values as an actual gamma curve value, wherein n is an integer higher than or equal to 5, wherein the step of calculating the reference gamma curve value of each of the reference images, comprises:

detecting a reference input grayscale and a reference output brightness value of each of the reference images;

calculating a reference gamma curve value of each of the reference images according to the reference input grayscale, the reference output brightness value and a gamma mathematic model, wherein the gamma mathematic model expresses a corresponding relationship between the reference input grayscale and the reference output brightness value, and the gamma mathematic model is:

$$\frac{Tx - To}{T255 - To} = \left(\frac{Lx}{255}\right)^{Gamma}$$

wherein Tx is the reference output brightness value, T255 is the output brightness value corresponding to the input grayscale with a value of 255, T0 is the output brightness value corresponding to the input grayscale with a value of 0, Lx is the reference input grayscale, and Gamma is the actual gamma curve value;

using the calculation module to determine a target input grayscale corresponding to the preset target brightness value according to the actual gamma curve value;

using an adjustment module to set a difference between the original input grayscale and the target input grayscale as a grayscale compensation value of the non-uniform block;

transmitting the grayscale compensation value to the display panel, and setting a sum of the grayscale compensation value and the original input grayscale of the non-uniform block as a new input grayscale of the non-uniform block in the display panel, to eliminate the non-uniform block of the current image.

12. The grayscale adjustment method according to claim 11, before the step of determining the target input grayscale corresponding to the preset target brightness value according to the actual gamma curve value, the grayscale adjustment method further comprising:

obtaining an output brightness value of a central point of the current image, and setting the output brightness value of the central point of the current image as the preset target brightness value.

13. The grayscale adjustment method according to claim 11, before the step of determining the target input grayscale corresponding to the preset target brightness value according to the actual gamma curve value, the grayscale adjustment method further comprising:

obtaining an output brightness value of each of pixels of remaining blocks of the current image other than the non-uniform block, and setting a mean value of the obtained output brightness value as the preset target brightness value.

* * * * *